United States Patent
Park et al.

(10) Patent No.: US 7,481,185 B1
(45) Date of Patent: Jan. 27, 2009

(54) MULTI-MODE 2-STROKE/4-STROKE INTERNAL COMBUSTION ENGINE

(75) Inventors: Sungbae Park, Cupertino, CA (US); Jasim Ahmed, Mountain View, CA (US); Han Ho Song, Stanford, CA (US); Aleksandar Kojic, Sunnyvale, CA (US); Jean-Pierre Hathout, Stuttgart (DE); Martin Rauscher, Ludwigsburg (DE); John F. Christensen, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 11/893,298

(22) Filed: Aug. 14, 2007

(51) Int. Cl.
*F02B 69/06* (2006.01)
*F02B 1/12* (2006.01)

(52) U.S. Cl. .................... 123/21; 123/27 R

(58) Field of Classification Search ............ 123/21, 123/27 R
See application file for complete search history.

(56) References Cited

U.S. PATENT DOCUMENTS

| | | | |
|---|---|---|---|
| 6,390,054 B1 | 5/2002 | Yang | |
| 6,615,771 B2 * | 9/2003 | Denger et al. | 123/21 |
| 6,619,242 B2 * | 9/2003 | Kaneko | 123/21 |
| 6,742,494 B2 | 6/2004 | Unger et al. | |

OTHER PUBLICATIONS

P. Najt, and D. Foster, "Compression-Ignited Homogeneous Charge Combustion," SAE paper 830264, 1983.
R. Thring, "Homogeneous-Charge Compression-Ignition (HCCI) Engines," SAE paper 892068, 1989.
M. Christensen, B. Johansson, and P. Einewall, "Homogeneous Charge Compression Ignition (HCCI) Using Isooctane, Ethanol and Natural Gas—A Comparison with Spark Ignition Operation," SAE paper 972874, 1997.
Caton, P. A., Simon, A. J., Gerdes, J.C., and Edwards, C.F. "Residual-Effected Homogeneous Charge Compression Ignition at a Low Compression Ratio Using Exhaust Reinduction," Int. J. Engne Res., vol. 4, No. 3, 2003.
Kaahaaina, N., Simon, A., Caton, P., and Edwards C. "Use of Dynamic Valving to Achieve Residual-Affected Combustion," SAE Transactions, Journal of Engines, vol. 110, Section 3, pp. 508-519, 2001-01-0549.
Z. Chen, M. Konno, M. Oguma, and T. Yanai, "Experimental Study of CI Natural-Gas/DME Homogeneous Charge Engine," SAE paper 2000-01-0329, 2000.
J. Yang, T. Culp, and T. Kenney, "Development of a Gasoline Engine System Using HCCI Technology—The Concept and the Test Results," SAE paper 2002-01-2832, 2002.

(Continued)

*Primary Examiner*—Noah Kamen
(74) *Attorney, Agent, or Firm*—Kenyon & Kenyon LLP

(57) ABSTRACT

In a multi-mode, 2-stroke/4-stroke internal combustion engine operation, by switching the engine stroke from 4-stroke operation to 2-stroke operation so that the combustion frequency is doubled, doubling of the engine power is achieved even at the same work output per cycle. In order to meet the demand of extremely high power, the engine operates in 4-stroke boosted SI operation transitioned from 2-stroke HCCI operation at pre-set level of power and crank speed requirements. By combining the multi-stroke (2-stroke HCCI and 4-stroke HCCI) and multi-mode operation (2-stroke HCCI and 4-stroke boosted SI operation), full load range and overall high efficiency with minimal NOx emission are achieved.

6 Claims, 5 Drawing Sheets

OTHER PUBLICATIONS

Andre Kulzer, Ansgar Christ, Martin Rauscher, Christina Sauer, Gernot Wurfel and Thomas Blank, "Thermodynamic analysis and benchmark of various gasoline combustion concepts," SAE paper 2006-01-0231, 2006.

G. Haraldsson and B. Johansson, "Operating Conditions Using Spark Assisted HCCI Combustion During Combustion Mode Transfer to SI in a Multi-Cylinder VCR-HCCI Engine," SAE paper 2005-01-0109, 2005.

N. Milovanovic et al., "SI-HCCI-SI Mode Transition at Different Engine Operating Conditions," SAE paper 2005-01-0156, 2005.

J. A. Eng, "Characterization of Pressure Waves in HCCI Combustion," SAE paper 2002-01-2859, 2002.

* cited by examiner

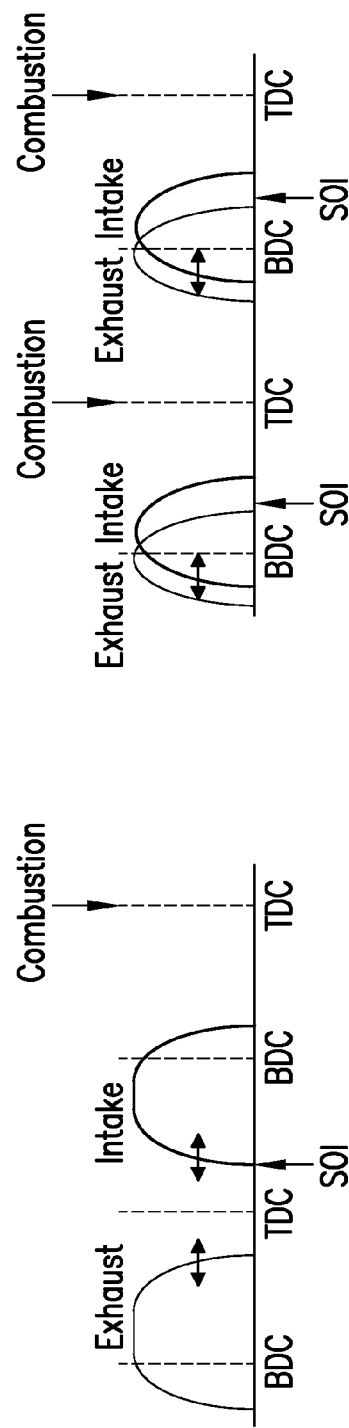
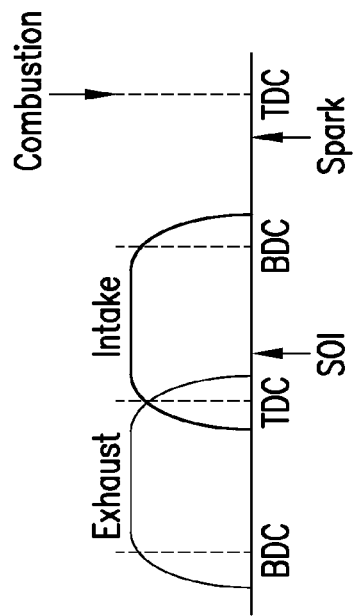
FIG. 3a
FIG. 3b
FIG. 3c

MULTI-MODE 2-STROKE/4-STROKE INTERNAL COMBUSTION ENGINE

BACKGROUND OF THE INVENTION

1. Field of the Invention

The present invention relates to a multi-mode, 2-stroke/4-stroke internal combustion engine operation which maximizes efficiency and power, while minimizing emission.

2. Description of Related Art

Spark Ignition (SI) engines, which are widely used in United States in passenger vehicles, suffer from low efficiency in comparison to Compression Ignition (CI), or Diesel engines, especially in a partial load due to throttling. CI engines, however, exhibit high particulate and NOx emissions characteristics due to their combustion nature. Recently, Homogeneous Charge Compression Ignition (HCCI) engines have been introduced, which have higher efficiency comparable to CI engines as well as minimum particulate and NOx emissions characteristics, with the versatility of using gasoline as well as diesel fuel.

In HCCI engines, a spark plug or a high-pressure injector is not used for initiation of the ignition of the fuel; instead, auto-ignition of the fuel (either gasoline or diesel) and air mixture at the end of the compression stroke is achieved by providing an elevated starting temperature at the beginning of the stroke. This elevated temperature is achieved mostly by two ways: heating the intake air or using the exhaust gas from the previous cycle. In the latter system, one can re-induct or trap the hot exhaust gas from the previous cycle by changing the valve timings.

The amount of the exhaust gas trapped in HCCI engines is usually about 50% in mass of the total gas inside the cylinder. Although this exhaust gas increases the mixture temperature before combustion, it actually decreases the peak temperature after combustion due to dilution effect. As a result, the NOx emission, which is exponentially proportional to the gas temperature, is about two orders of magnitude lower than that in conventional SI or CI engines. One can also achieve higher efficiency comparable to CI engines due to the dethrottling of the intake manifold and combustion shape closer to ideal Otto cycle.

However, the limited work output is one of the major challenges in HCCI operation, which limitation is caused by the high dilution of mixture in the cylinder. The dilution with hot exhaust gas is not only required to increase the mixture temperature to achieve auto-ignition, but also required to limit the high rate of pressure rise, which otherwise would be destructive to the engine components. In this case, almost half of the cylinder is filled with the exhaust gas, which results in producing approximately half of the work output compared to that in SI of the same engine volume.

To overcome the load limitation, current state of art utilizes a hybrid of HCCI/SI or boosted HCCI. In a hybrid approach, a mode switching from SI to HCCI occurs when the low load is required where SI has poor efficiency (see, e.g., U.S. Pat. Nos. 6,390,054 B1, and 6,742,494 B2). However, in this case, the emission and efficiency benefits of HCCI operation are lost in the medium to high load range, and the transient combustion control of HCCI in mode switching is not a subtle issue in current research and industries. Secondly, boosted HCCI may give higher power, but it is also limited since the combustion becomes too noisy and destructive due to the high rate of pressure rise from rapid burn rate.

A BRIEF SUMMARY OF THE INVENTION

An objective of the present invention is to provide an internal combustion engine which achieves a wide load range of HCCI operation without sacrificing the efficiency and emissions advantages.

Another objective of the present invention is to provide an internal combustion engine which achieves the extremely high load range with smooth transition and maintains high efficiency.

In accordance with the present invention, the intrinsic load limitation of HCCI is overcome by switching the engine stroke from 4-stroke ("4S") to 2-stroke ("2S") so that the combustion frequency is doubled and hence, even at the same work output per cycle, the engine can double the power which is comparable to that in the conventional SI/CI engines. Although this stroke switching of the present invention produces about the similar power range as the mode switching from 4S HCCI to 4S SI does, the differences are in the emission and efficiency. HCCI operation is inherently clean and efficient combustion even in 2S operation. Additionally, the stroke switching between the same combustion strategies is much simpler and smoother than the mode switching between the different strategies. Consequently, the stroke switching is superior to mode switching.

To operate in 2S HCCI mode, the followings are required: The first is the flexible valve system such as Electro-Hydraulic Valve System (EHVS) or cam-phaser to operate at different valve profiles for stroke switching between 2S to 4S HCCI. Secondly, a super charger or combination of turbo and super chargers to boost the intake manifold to enable fast gas exchange for 2S operation. It is noteworthy that in 2S HCCI, the complete scavenging is not required because large portion of the exhaust gas is used in the next cycle, which makes the system and control simpler than in a hybrid of 4S/2S SI which has additional intake system for 2S operation as seen in U.S. Pat. No. 5,007,382, for example. In the present invention, a slight modification in the intake valve may be required to enhance the flow motion for fast gas exchange process. Finally, the direct injection system is required to precisely control the HCCI combustion and prevent the short-circuiting of the intake charge in 2S operation.

In order to meet the demand of the extremely high power, in present invention the engine operates on 4S boosted SI transitioned from 2S HCCI at pre-set level of power and crank speed requirements. Having the flexible valve system, supercharger or combined with turbo charger, and direct injection system allows the full controllability on smooth transition from 2S HCCI to 4S boosted SI. 4S boosted SI produces up to 40-80% more power than 2S HCCI operation in the present invention. In summary, by combining the multi-stroke (2S HCCI and 4S HCCI) and multi-mode operation (2S HCCI and 4S boosted SI), full load range and overall high efficiency with minimal NOx emission may be achieved in comparison to conventional SI or SI/HCCI strategies.

BRIEF DESCRIPTION OF THE SEVERAL VIEWS OF THE DRAWING

FIGS. 3a, 3b and 3c show valve timing diagrams for 4S HCCI, 2S HCCI and 4S SI, respectively.

DETAILED DESCRIPTION OF THE INVENTION

Figures 1A, 1B:
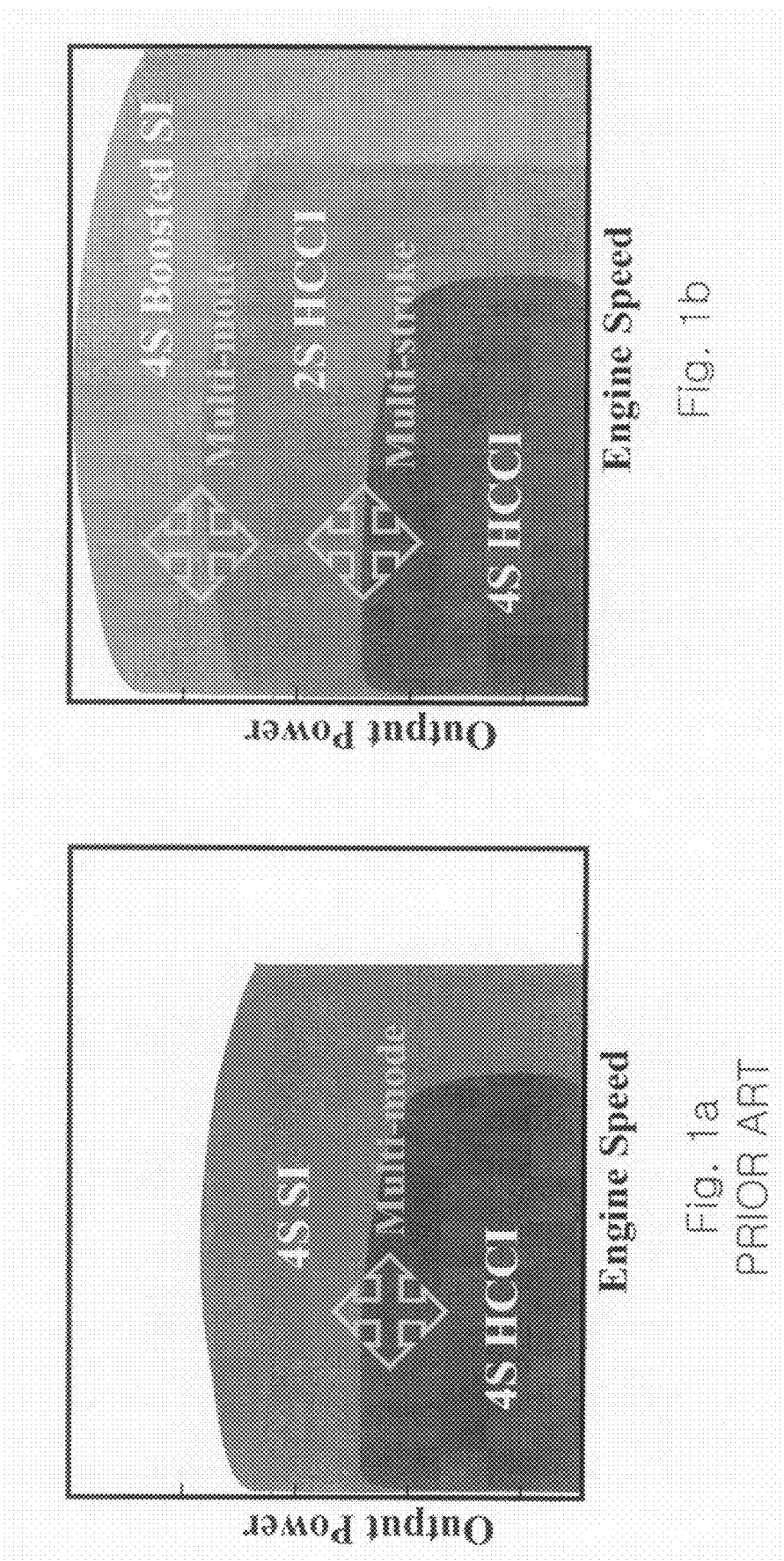
FIG. 1a shows a graph of engine output vs. engine speed for the conventional multi-mode operation.
FIG. 1b shows a graph of engine output vs. engine speed for the multi-mode/multi-stroke operation in accordance with the present invention.

FIGS. 1a and 1b show the comparison of engine operation strategy between mode switching and mode/stroke switching in terms of output power versus engine speed. FIG. 1a represents the conventional 4S SI/HCCI multi-mode strategy. At low power output, the conventional SI engine suffers lower efficiency mainly due to the intake throttling. Typical HCCI engine uses wide-open-throttle and controls the output power by varying the ratio between exhaust gas and fresh charge, called residual fraction (RF). This dethrottling combined with nearly constant volume combustion process results in higher efficiency of HCCI operation at low power. In addition to the efficiency benefit, HCCI engine minimizes the $NO_x$ emissions from the dilution effect as mentioned above. For these reasons, the multi-mode engine is operated in 4S HCCI at low power output region. On the other hand, at high power limit, the RF in HCCI operation should be decreased to provide enough fresh charge, which results in high rate of heat release and high peak pressure and temperature due to lower dilution of exhaust gas, which is very destructive to the engine. Therefore, the mode switching from 4S HCCI to 4S SI occurs to meet the power requirement as the power demand increases. At high power output, SI operation recovers the efficiency by lowering the level of throttling, but the efficiency and emission benefits of HCCI over SI are still sacrificed. At high engine speed, the 4S HCCI operation is limited due to increased trapped gas temperature and hence suffers rapid heat release during combustion. This sets the higher engine speed limit of 4S HCCI and the engine is operated in 4S SI, even at low power output. Consequently, the intake throttling is inevitable and the multi-mode engine suffers the low efficiency in this region of operation.

FIG. 1b shows the operational strategy of the present invention combining multi-mode and multi-stroke operation strategies. At low power output and low-to-medium engine speed, the engine is running in 4S HCCI for the same reasons as in the conventional multi mode. As the intermediate or high power is required, the engine is switched to 2S HCCI instead of 4S SI. Operating in 2S HCCI has two advantages over using 4S SI. First, while doubling the combustion frequency in 2S HCCI produces power output comparable to 4S SI, the benefits of high efficiency and low $NO_x$ emissions of HCCI operation are retained. Second, the stroke switching is able to be achieved more smoothly than mode switching. The temperature range of exhaust gas is similar in 4S HCCI and 2S HCCI, but typical 4S SI has 200-300 degrees higher exhaust temperature. Considering that HCCI phasing is sensitive to the temperature of trapped gas, the stroke switching achieves smoother transient operation than the mode switching. Additionally, 2S HCCI can cover the high engine speed range with moderate rate of heat release. In 2S operation, the mixture does not have enough time to mix completely due to shortened gas exchange process and compression stroke, and hence this less homogeneous mixture results in slower heat release than in 4S HCCI and makes 2S HCCI a feasible solution to operate at higher speed. In addition, for extremely high power and engine speed requirements, the engine may be switched to 4S boosted SI operation so that the higher limit of the output power can be extended over 2S HCCI operation. This mode switching is also readily possible due to the flexible valve timing and intake boost system. Consequently, in accordance with the present invention, the efficiency and emission benefits of HCCI can be exploited in typical operating range of the multi mode strategy and 4S boosted SI operation expands the operating range to the higher power and speed region.

Figure 2:
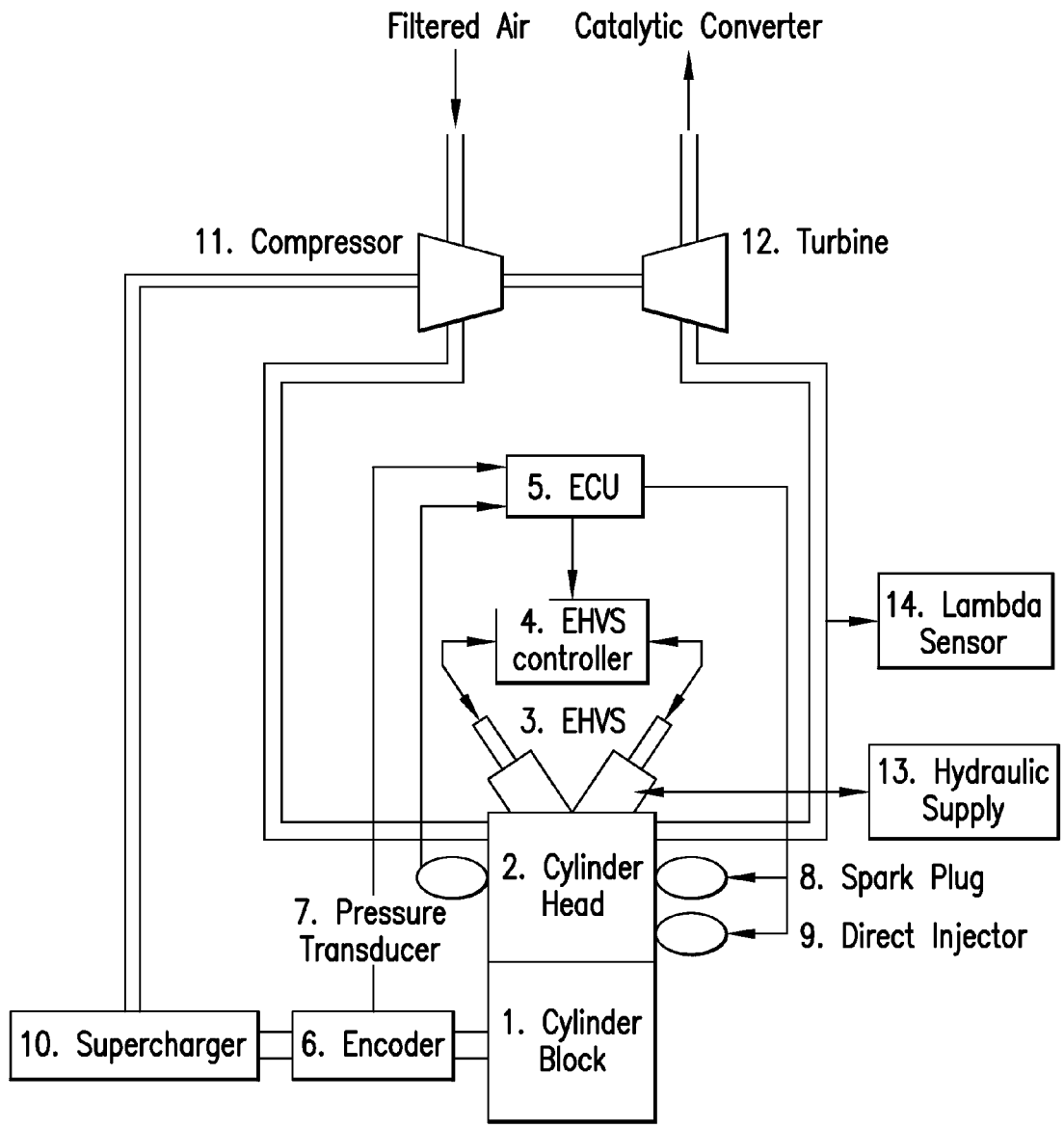
FIG. 2 shows an example embodiment of an engine system for implementing the operation according to the present invention.

FIG. 2 shows a block diagram of an example engine system in accordance with the present invention. The enabling technologies for multi-mode/multi-stroke operation include variable valve actuation such as an EHVS (or cam-phaser) 3, EHVS controller 4, hydraulic supply 13, direct injector 9 and combinations of supercharger 10, compressor 11 and turbine 12. In addition, the electronic control unit (ECU) 5 monitors the power demand and engine speed, and determines the optimal combustion strategies among 4S HCCI, 2S HCCI and 4S boosted SI according to the pre-set operational map. The information of the engine speed and the piston location for stroke/mode switching is transmitted from the incremental encoder 6 which is connected to the crank shaft. The in-cylinder pressure trace is measured by a pressure transducer or ion sensor 7 and monitored by ECU 5. From the pressure signal, ECU 5 locates the combustion phasing of the current operating condition and performs the feedback control of combustion timing by changing valve timing or fuel injection timing. The measurement in lambda sensor 14 provides the misfire information, and intake and coolant temperature sensors, which are not shown in FIG. 2, are used to provide a feedback signal to reject disturbances from real environment operation.

FIGS. 3a, 3b and 3c show the valve timing diagrams, i.e., exhaust and intake valve timings, for different combustion strategies. In FIGS. 3a, 3b and 3c, SOI stands for start of injection, BDC for bottom dead center, and TDC for top dead center. Combustion TDC is explicitly labeled with "TDC" and "combustion," while intake TDC is simply labeled "TDC." In each of FIGS. 3a, 3b and 3c, two engine revolutions are shown, i.e., 720 crank angle degree (CAD) operation.

FIG. 3a shows the valve timing for 4S HCCI. To trap some amount of exhaust gas, the exhaust valve closes before TDC and intake valve opens after TDC. There is no valve overlap, called negative valve overlap (NVO). As depicted with lateral arrows in FIG. 3a, exhaust valve closing timing (EVC) and intake valve opening timing (IVO) are adjusted symmetrically to change RF in the next cycle: the earlier EVC, the higher RF. The fuel is injected after IVO, but this can be flexibly changed to meet the power output and combustion phasing requirements. At the end of compression stroke, the combustion phasing occurs near TDC, as shown in red. The valve timings and injection strategies shown in FIG. 3a represent one example embodiment of 4S HCCI. Other embodiments with other valve strategies such as late intake valve closing, and other injection strategies such as multiple injection strategies, are possible.

FIG. 3b shows the valve timing for 2S HCCI operation. It should be noted that there is one combustion event per revolution, which is double the frequency than in 4S operation. The exhaust valve opens during expansion stroke and closes after BDC. The intake valve opens after EVO and closes in the middle of compression stroke. Hence, there is valve overlap in 2S HCCI operation, and it is when the scavenging takes place. The amount of valve overlap is used to control the power output: at larger valve overlap, the air flow increases due to higher scavenging and the power output will be increased. Complete scavenging does not need to occur since HCCI operation requires significant amount of burnt gas remaining inside the cylinder, which makes the system simpler because the complete scavenging has always been an issue of 2S operation.

The intake boost system is required for efficient scavenging and delivery of the intake air during compression stroke. IVC is optimized to minimize the need for intake boost pressure and hence maximize the overall system efficiency at a given condition. For example, early IVC results in poor charging efficiency and late IVC induces backflow of the mixture gases into the intake manifold, which results in the uncertainty of mixture composition in the next cycle. The fuel for 2S HCCI operation is directly injected into the cylinder after EVC to eliminate the fuel escape into the exhaust port. The injection timing and duration should be optimized to ensure that optimal combustion phasing occurs. It is also possible to optimize the efficiency, emissions and power by controlling the other valve timings.

FIG. 3c shows the valve timing for 4S boosted SI. Although it has some similarities to the typical valve timing of 4S DISI (direct injection spark ignition), including valve overlap during gas exchange, injection during intake stroke, and spark ignition before TDC, the difference is in that the intake has boost pressure which increases the power output, and IVC, spark timing, and injection timing should be adjusted to prevent knocking from occurring with high boost pressure and compression ratio than in the typical DISI engine.

To switch the stroke/mode according to the power and speed requirements, the valve timings mentioned above, as well as spark ignition, boost of intake air and injection timings are changed as preset configuration. This switching should occur at combustion top dead center (TDC) because this allows the engine to be ready for different stroke/mode operation in the next cycle. The details of operation in each mode are explained below.

In 4S HCCI operation, the exhaust gas is trapped during NVO and mixed with fresh air and fuel. The trapped gas raises the initial mixture temperature, so the mixture will be ignited at the end of compression stroke. To vary the power output, the RF is changed by adjusting the duration of NVO, and combustion phasing is controlled by injection timing. The super and turbo chargers and spark ignition system are turned off in this operation.

When the combustion mode is switched to 2S HCCI, the super and turbo chargers are activated. This super and turbo charging combination is configured to optimize the overall efficiency of the engine. For example, at a low engine speed where there is not enough energy available in the exhaust, the super charger is mainly operating, while, at a high speed, both the super and turbo chargers are activated to boost the intake air. The exact balance of operation between the super and turbo chargers depends on the engine operating condition. An intercooler may be incorporated to increase the efficiency of the boosting system. The engine power output is controlled by the duration of valve overlap, that is, the extent of the scavenging. Due to shortened gas exchange process, 2S HCCI can be more susceptible to cyclic variations, which requires the feedback control on the combustion event. The combustion control is achieved by two factors: IVC which determines the effective compression ratio, and injection timing which affects the homogeneity of mixture.

In 4S boosted SI operation, the super and turbo charger are fully operating to achieve the high engine power output. Since the turbo charger is already being turned on in 2S HCCI operation, the turbo lag is minimized in the transition between 2S HCCI and 4S boosted SI operations. Due to high geometric compression ratio for HCCI operation, the typical 4S SI operation suffers from high probability of knocking. To resolve this problem, the delayed IVC which lowers the effective compression ratio or stratified and leaner combustion by direct fuel injection are employed.

Figure 4:
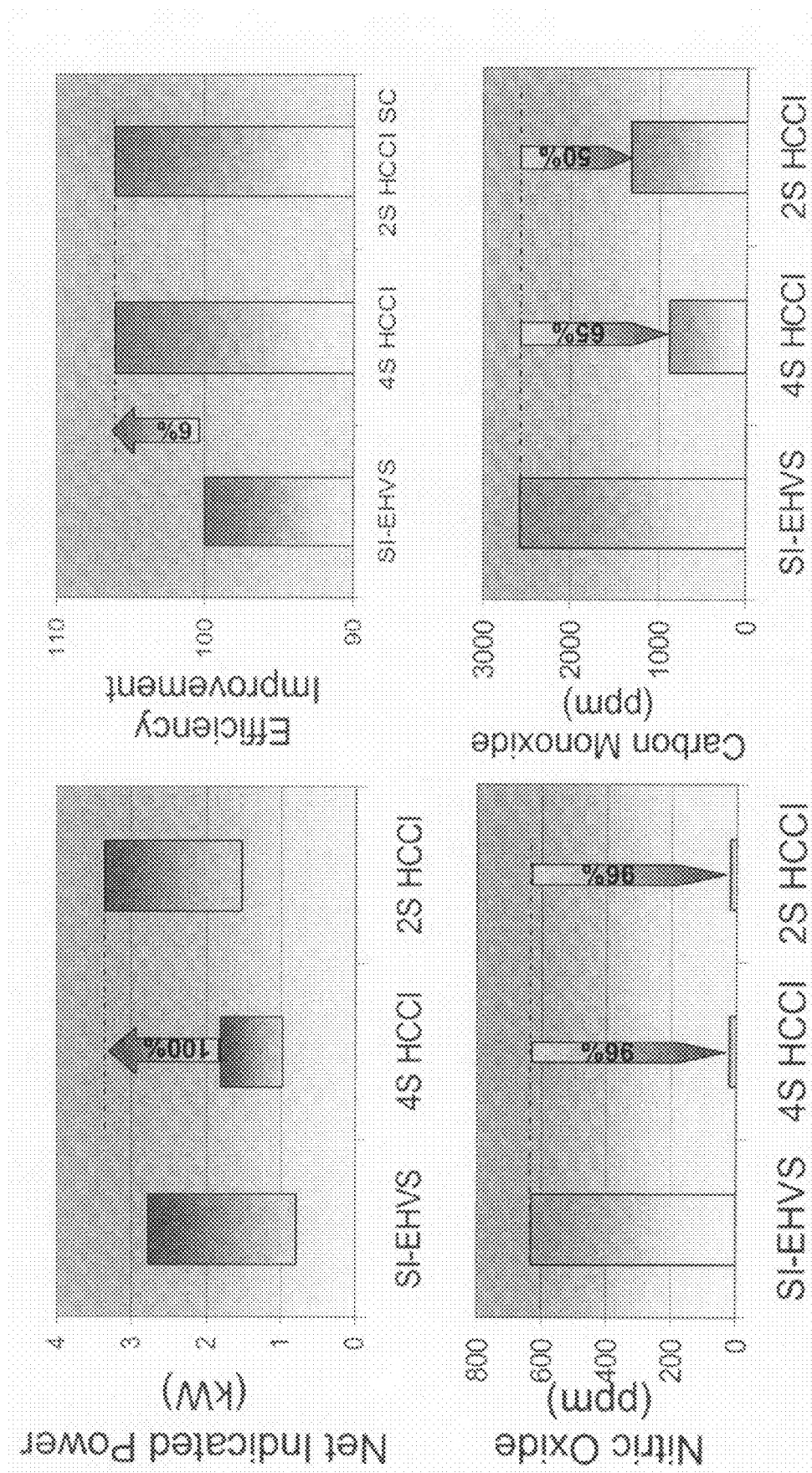
FIG. 4 shows the power, efficiency, nitric oxide emissions, and carbon monoxide emissions characteristics for 4S SI, 4S HCCI and 2S HCCI.

FIG. 4 shows the performance comparisons in multi stroke operation on a single cylinder engine in the laboratory. The geometric compression ratio is 13 and the engine is operating at 1000 RPM fixed. The data tagged SI-EHVS is from a typical operation of 4S SI in the same engine configuration, and thus, presented for reference. As shown in the chart of "net indicated power" comparison, the power output of 4S SI is varied from as low as 4S HCCI to as high as 2S HCCI. For the HCCI operation, the angle of peak pressure during combustion is adjusted to be around 10 CADs after combustion TDC to maximize the work output.

In FIG. 4, it is very clearly shown that conventional 4S HCCI has higher efficiency and much lower $NO_x$ emissions compared to 4S SI, but the range of power output is quite limited, especially in the high limit. 2S HCCI overcomes this power limitation by doubling the combustion frequency while maintaining the high efficiency and low $NO_x$ emissions. Consequently, 2S HCCI operation can cover the power requirement comparable to 4S SI with high efficiency and low emissions. In the specific experiment which is reflected in FIG. 4, carbon monoxide emissions are also lower in HCCI operations than in 4S SI.

Figure 5:
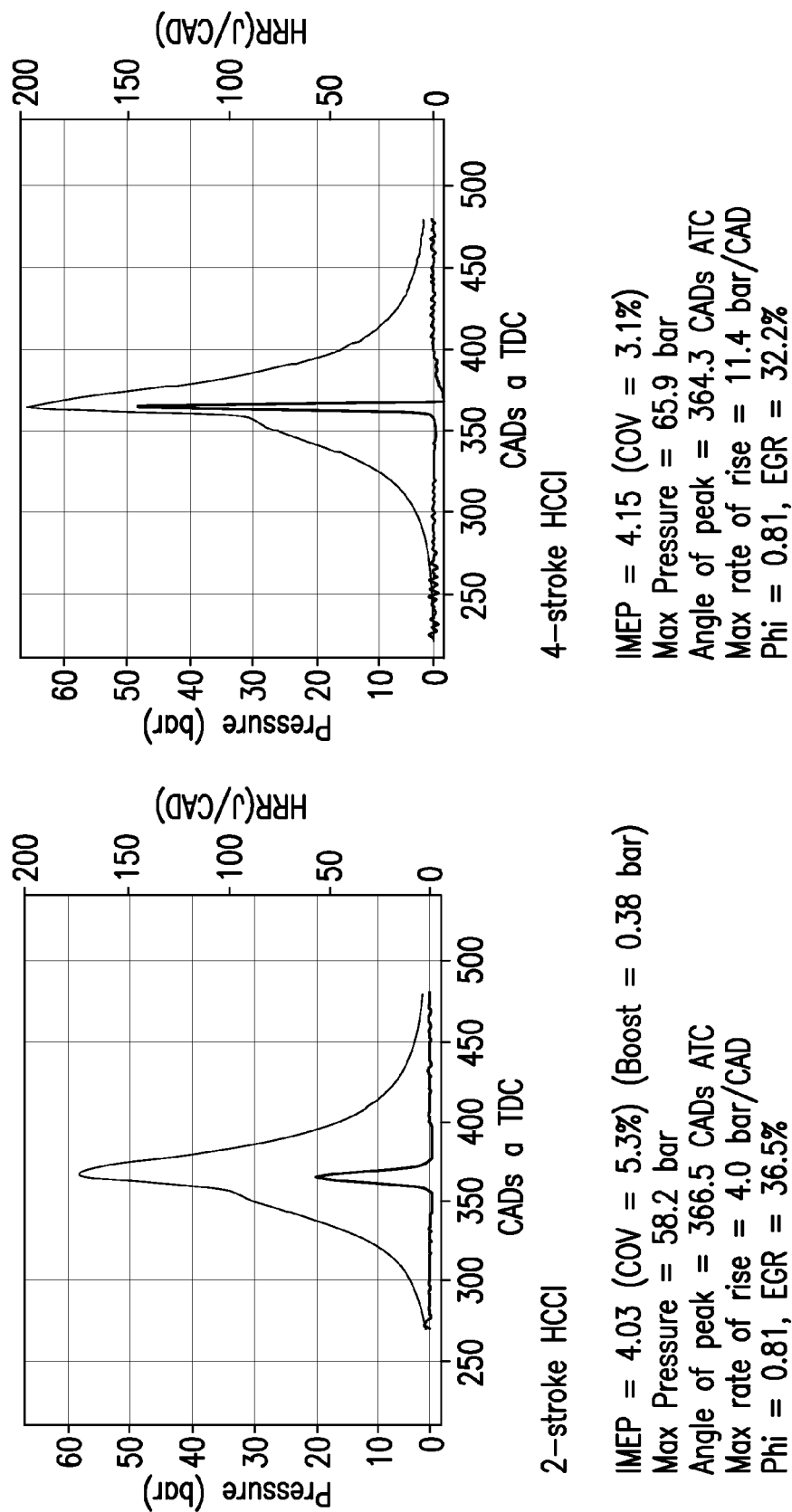
FIG. 5 shows the pressure trace and calculated heat release rate from experimental data of 4S HCCI and 2S HCCI operation.

In FIG. 5, the pressure trace and calculated heat release rate are depicted. The selected data points are corresponding to approximately 4 bar of IMEP from 2S HCCI and 4S HCCI mode. It is clear that 4S HCCI has much faster heat release rate and higher peak pressure. The data points in FIG. 5 represent just one specific example, but similar combustion characteristics are observed in the other experimental data which are not shown here. This is closely related to the aforementioned statement that 2S HCCI has less homogenous mixture due to shortened gas exchange period, which leads to slower heat release rate. The slower combustion rate enables the high engine speed operation where 4S HCCI suffers from high rate of heat release.

Although the present invention has been described above in connection with an example embodiment and an example method, the present invention is not limited to such example embodiment and method, and it is intended that modifications, changes, and/or substitutions are to be included within the scope of the present invention.

What is claimed is:

1. A method of operating an internal combustion engine including an engine cylinder having a piston, comprising:
   providing a four-stroke engine cycle, Homogeneous Charge Compression Ignition engine operation for a first characteristic engine operating region having an upper boundary defined by a first power output threshold and a first engine speed threshold;
   providing a two-stroke engine cycle, Homogeneous Charge Compression Ignition engine operation for a second characteristic engine operating region having an upper boundary defined by a second power output threshold and a second engine speed threshold, wherein the second power output threshold is greater than the first power output threshold, and wherein the second engine speed threshold is greater than the first engine speed threshold; and providing a four-stroke engine cycle, boosted Spark Ignition engine operation for a third characteristic engine operating region having an upper boundary defined by a third power output threshold and a third engine speed threshold, wherein the third power output threshold is greater than the second power output threshold, and wherein the third engine speed threshold is greater than the second engine speed threshold;

wherein the first, second and third characteristic engine operating regions are sequentially contiguous.

2. The method according to claim 1, wherein the internal combustion engine has a standard four-stroke design with a valving system having fully variable valves configured to execute timing and travel profiles independently with respect to a position of the piston in the cylinder.

3. The method of claim 2, further comprising:

determining, based on load demand and a current state of the engine, the timing and travel profiles of the fully variable valves to be executed.

4. A system for implementing a multi-stroke, multi-mode operation for an internal combustion engine including an engine cylinder having a piston, comprising:

an electronic controller configured to implement three different engine operation modes for the internal combustion engine;

a variable valving system coupled to the electronic controller and responsive to signals transmitted by the electronic controller/observer to actuate intake and exhaust valves of the cylinder in a fully variable manner; and a turbocharger coupled to the cylinder and controlled by the electronic controller to provide a pressure-boosted charge to the cylinder, enabling introduction of a charge without movement of the piston;

wherein a four-stroke engine cycle, Homogeneous Charge Compression Ignition engine operation is implemented for a first characteristic engine operating region having an upper boundary defined by a first power output threshold and a first engine speed threshold;

wherein a two-stroke engine cycle, Homogeneous Charge Compression Ignition engine operation is implemented for a second characteristic engine operating region having an upper boundary defined by a second power output threshold and a second engine speed threshold, wherein the second power output threshold is greater than the first power output threshold, and wherein the second engine speed threshold is greater than the first engine speed threshold;

wherein a four-stroke engine cycle, boosted Spark Ignition engine operation is implemented for a third characteristic engine operating region having an upper boundary defined by a third power output threshold and a third engine speed threshold, wherein the third power output threshold is greater than the second power output threshold, and wherein the third engine speed threshold is greater than the second engine speed threshold;

wherein the first, second and third characteristic engine operating regions are sequentially contiguous.

5. The system of claim 4, wherein the engine has a standard four-stroke design, and wherein the variable valving system has fully variable valves configured to execute timing and travel profiles independently with respect to a position of the piston in the cylinder.

6. The system of claim 5, wherein the electronic controller determines, based on load demand and a current state of the engine, the timing and travel profiles of the fully variable valves to be executed.

* * * * *